E. L. SEGERLUND.
RAT TRAP.
APPLICATION FILED JAN. 10, 1912.

1,084,493.

Patented Jan. 13, 1914.

Inventor
Elmer L. Segerlund.

Witnesses

By Victor J. Evans
Attorney

COLUMBIA PLANOGRAPH CO., WASHINGTON, D. C.

UNITED STATES PATENT OFFICE.

ELMER L. SEGERLUND, OF CLEVELAND, OHIO.

RAT-TRAP.

1,084,493.

Specification of Letters Patent.  Patented Jan. 13, 1914.

Application filed January 10, 1912.  Serial No. 670,422.

*To all whom it may concern:*

Be it known that I, ELMER L. SEGERLUND, a citizen of the United States, residing at Cleveland, in the county of Cuyahoga and State of Ohio, have invented new and useful Improvements in Rat-Traps, of which the following is a specification.

This invention relates to traps and more particularly to mouse or rat traps.

The principal object of the invention is to provide a simple and efficient device of this character which may be cheaply constructed and wherein the mouse or rat is compelled to get in or beneath the trap before he can gain access to the bait.

Broadly speaking, the invention comprises an inverted cup shaped member pivoted at one side to a base or support and having its other side held in raised position by a conical bait holder which is adapted to oscillate upon being attacked by the rat or mouse and which is hollow so as to receive a quantity of bait.

Further objects of this invention will appear as the following specific description is read in connection with the accompanying drawing which forms a part of this application, and in which:—

Figure 1:
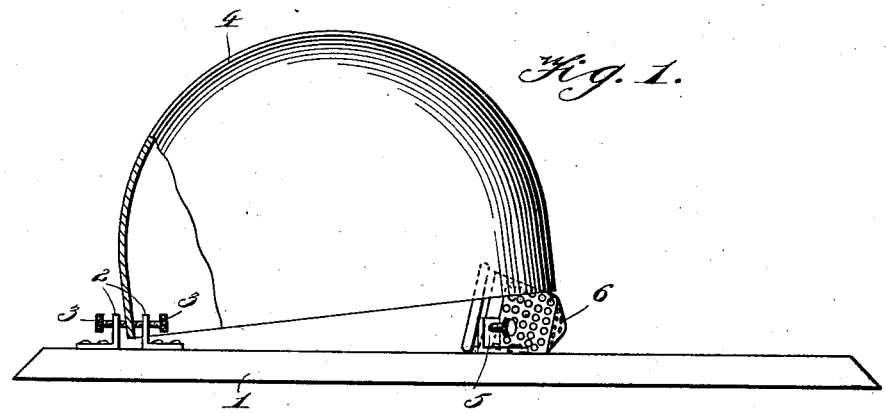
Figure 2:
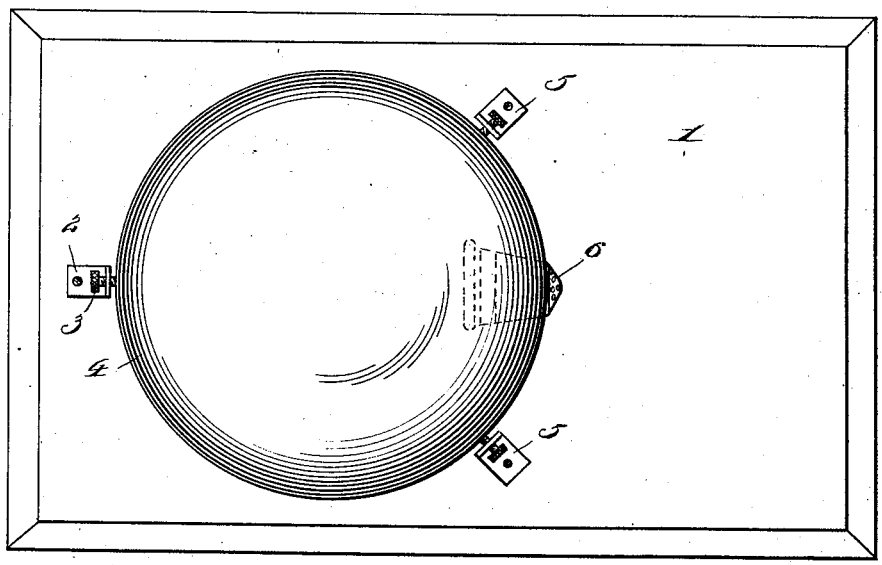

Figure 1 is a side elevation. Fig. 2 is a top plan view.

Referring more particularly to the drawing 1 represents a rectangular base upon which is mounted adjacent one end thereof a pair of substantially L-shaped brackets 2, said brackets being disposed longitudinally with respect of the base and faced in opposite directions and having set screws 3 passing therethrough and adapted to engage the inner and outer surface of a substantially cup-shaped member 4 which is preferably constructed of lead or other material having the proper weight, said screws 3 being adjustable longitudinally with respect to the rectangular base 1. Other brackets 5 having set screws 5' threaded therein are arranged at intervals around the edge of the cup-shaped-member so that the said member may be secured in closed position after the bait container, to be hereinafter described, has been displaced.

In order that the edge opposite the pivoted point of the cup-shaped member may be in raised position, I employ a support 6 in the nature of a foraminous frustum of a cone which is hollowed out so as to receive the bait. The bait container and support rests upon a base with the large end innermost or beneath the cup shaped member and with the edge of the cup shaped member resting upon the same immediately adjacent the small end thereof.

The foramina in the combined bait container and support are so small that it is impossible for the mouse to gain access to the bait therethrough, it being necessary to get beneath the cup shaped member in order to gain access to the bait. Immediately upon attacking the support to secure the bait, the same will oscillate and will work its way from beneath the edge of the cup-shaped member, thus permitting the same to drop and trap the animal.

What I claim as new is:—

A trap comprising a base, an inverted cup-shaped member, means for supporting the said member above the base, means adjustable longitudinally, with respect to the base and engaging the inner and outer surface of the said inverted cup-shaped member adjacent the free edge thereof for pivotally connecting the latter with the base and operable when adjusted to one position to permit the said member to be lifted vertically from the base, and means engaging the outer surface of the inverted cup-shaped member for retaining said member in closed position, the said adjusting means when adjusted to another position coöperating with the retaining means to hold said member in said closed position.

In testimony whereof I affix my signature in presence of two witnesses.

ELMER L. SEGERLUND.

Witnesses:
W. H. THOMAS,
FRED. L. MORITZ.

Copies of this patent may be obtained for five cents each, by addressing the "Commissioner of Patents, Washington, D. C."